United States Patent [19]
Von Loewis et al.

[11] 3,840,087
[45] Oct. 8, 1974

[54] PUMP ARRANGEMENT FOR THE BRAKE SYSTEM OF A MOTOR CAR

[75] Inventors: Alexander Von Loewis, Menar, Mauren; Klaus-Otto Riesenberg, Ludwigsburg-Ossweil, both of Germany

[73] Assignee: Robert Bosch GmbH, Stuttgart, Germany

[22] Filed: Mar. 26, 1973

[21] Appl. No.: 345,205

[30] Foreign Application Priority Data
Apr. 21, 1972 Germany.............................. 2219468

[52] U.S. Cl............................. 180/82 R, 123/139 BA
[51] Int. Cl............................................... B60t 7/12
[58] Field of Search .................. 303/21 F, 10, 11; 180/82 R, 103, 104; 123/139 AV, 139 BA; 192/3 R

[56] References Cited
UNITED STATES PATENTS
3,439,662  4/1969  Jones et al. ....................... 180/82 R
3,524,684  8/1970  Skoyles.............................. 303/21 F
3,532,391  10/1970  Klein ................................. 303/21 F
3,639,009  2/1972  Klein et al. ........................ 303/21 F FOREIGN PATENTS OR APPLICATIONS
349,474  5/1931  Great Britain ............... 123/139 AV

*Primary Examiner*—Trygve M. Blix
*Assistant Examiner*—Stuart M. Goldstein
*Attorney, Agent, or Firm*—Michael S. Striker

[57] ABSTRACT

The cam shaft of a combustion engine drives not only a conventional fuel pump, but is additionally used for driving a pump which pumps brake fluid in a brake circuit designed for unlocking brake-locked wheels. A common connecting lever connects a follower, which is actuated by the cam shaft, with both pumps for synchronous operation.

11 Claims, 1 Drawing Figure

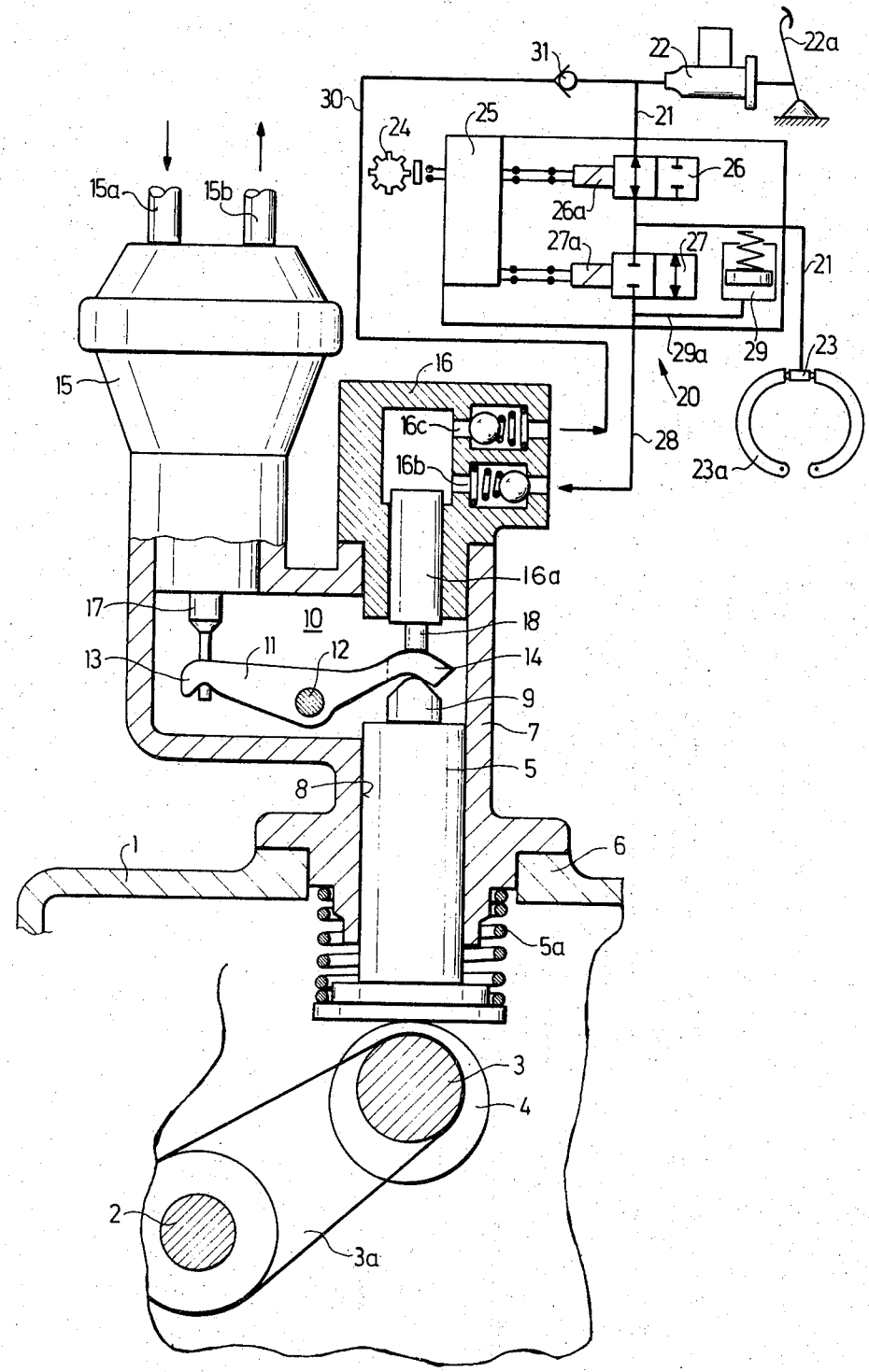

PUMP ARRANGEMENT FOR THE BRAKE SYSTEM OF A MOTOR CAR

BACKGROUND OF THE INVENTION

The present invention relates to a brake system for automatically unlocking a wheel locked by a brake. When a sensing means senses a brake-locked condition of a wheel, control valve means are operated to connect the brake cylinder operating the brake of the wheel, through a return pump with the master cylinder so that the wheel is unlocked. Shifting of the control valve also interrupts the flow of brake fluid from the master cylinder to the brake cylinder. A brake system of this type is disclosed, for example, in the German OS No. 1,964,819.

SUMMARY OF THE INVENTION

It is one object of the invention to provide a particularly compact, efficient and inexpensive arrangement for driving the return pump, required by the brake system, by means of standard parts of the engine of the motor car.

Another object of the invention is to drive a return pump of the brake system from the cam shaft of a combustion engine, which normally drives a fuel pump, and operates the valves of the engine.

With these objects in view, the present invention provides an arrangement in which the return pump of the brake system is driven from the cam shaft of the combustion engine from which also, at least, a fuel pump is driven at the same time, and preferably through a common push-rod operated as a follower by a cam of the cam shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is partly a sectional view illustrating a fuel pump and a brake fluid pump mounted on an engine housing, and partly a schematic diagram illustrating the hydraulic circuit of the brake system of which the brake fluid pump forms a part.

DESCRIPTION OF THE PREFERRED EMBODIMENT

A combustion engine has an engine housing and motor block 1 in which a crank shaft 2, driven by pistons, not shown, is mounted for rotation. Crank shaft 2 drives through a pulley and belt transmission 3a, a standard cam shaft 3 with cams 4. A series of cams 4 is provided for operating in the conventional manner, the valves for the cylinders of the engine.

In accordance with the invention, one of the cams 4 cooperates with a bottom flange of a push-rod 5 which is guided in a vertical guideway 8 for reciprocating motion, and is biased by a spring 5a toward the respective cam 4. The upper end of push-rod 5 is formed as a projection 9 projecting into a cavity 10 in a pump housing 7 mounted on the wall 6 of the engine housing 1. The connecting end portion 9 of pushrod 5, which constitutes a follower for the cam 4, cooperates with one arm 14 of a double-armed lever 11 which is mounted on a pivot 12 in the pump housing 7 for angular movement. When push-rod 5 is reciprocated in guideway 8 by the cam 4, connecting lever 11 is angularly reciprocated.

The pivot 12 is arranged in the cavity 10 so that under pressure of push-rod 5, and through end portion 9, the lever arm 14 moves away from the cam shaft 3, 4, while the other end 13 moves downward toward the same.

A fuel pump 15 having an inlet 15a and an outlet 15b for gasoline, and the return pump 16 of a brake system 20, are both mounted on the pump housing 7. The axes of pumps 15 and 16 are parallel, and the piston rods 17 and 18 of pumps 15 and 16 project into the cavity 10 into the region of the lever arms 13 and 14. The piston rod 17 of the fuel pump 15 is connected with the pivotal lever 11 in such a manner that the lever arm 13 exerts a pull on the piston rod 17 during the working stroke of the fuel pump 15, while the other lever arm exerts pressure on the piston rod 18 of the return pump 16.

Return pump 16 has a reciprocable piston 16a, and inlet and outlet means 16b and 16c provided with check valves opening in opposite directions.

The fuel pump 15 has similar piston means, not shown, reciprocated by the arm 13.

It is also possible to form the cylinders for the respective pistons of pumps 15 and 16, directly in the pump housing 7.

The operation of the fuel pump is part of the standard construction of the combustion engine, and instead of providing a separate drive, the present invention uses the cam shaft 3, 4 and the common connecting means 5, 11 for driving also the return pump 16 of the brake system 20. The only addition to a standard construction without the return pump 16 is the connecting lever 11, so that the arrangement can be manufactured at very low cost, while the return pump is reliably operated.

Referring now to the diagram in the upper right hand corner of the drawing, the brake system 20 includes a master cylinder 22 operated by a brake pedal 22a, and connected by brake conduit portion 21 and return conduit portion 28 with the inlet 16b of the return pump 16, while the outlet 16c is connected by the return conduit 30, having a check valve 31, with the master cylinder 22. Two electromagnetic shiftable control valves 26 and 27 are provided which schematically show a normal position in which the master cylinder 22 is connected by brake conduit 21, control valve 26 and the second part of brake conduit 21 with the brake cylinder 23 which operates the brake 23a acting on a wheel, not shown, of the motor car.

In the other position of control valves 26, 27, brake conduit 21 is interrupted by control valve 26, while the shifted control valve 27 connects the brake cylinder 23 and a portion of brake conduit 21 with a portion 28 of the return conduit so that fluid from the brake cylinder 23 is pumped by pump 16 through return conduit 30 back into master cylinder 22.

A sensor 24 is provided which senses the condition of the wheel, not shown, braked by brake 23a, and when the wheel is brake-locked, a signal is given to the electronic control means 25 which energizes the electromagnets 26a, 27a of control valves 26 and 27, shifting the same so that pump 16 pumps fluid from the brake cylinder 23 into the master cylinder 22, as explained above, so that the wheel is unlocked by brake 23a.

When the piston 16a of return pump 16 moves out of the illustrated lowest position, the brake fluid is pumped through return conduit 30 into the master cylinder immediately. If the pump piston 16a is in its upper position when the valves 26, 27 are shifted, the brake fluid cannot enter the inlet 16b of return pump 16, but flows through conduit 29a into the low pressure accumulator 29 from which the fluid is again discharged when piston 16a is in its lowest position.

From the above description of a preferred embodiment, it will become apparent that a pump arrangement in accordance with the invention comprises an engine 1, 2, 6 for driving a motor car, and including a cam shaft 3, 4; a first pump 15 for pumping fuel consumed by the engine; a brake system 20 for the motor car, including a second pump 16 for pumping brake fluid in the brake system 20; follower means 5 reciprocated by the cam shaft 3, 4; and connecting means 11 to 14 connecting the follower means 5 with the first pump 17, 15 and the second pump 18, 16 so that the second pump 16 is operated by the cam shaft 3, 4 which is provided at least for pumping fuel, to circulate fluid in the brake system 20.

It will be understood that each of the elements described above, or two or more together, may also find a useful application in other types of pump arrangements for brake systems of motor cars differing from the type described above.

While the invention has been illustrated and described as embodied in an arrangement in which the return pump of a brake system is driven simultaneously with the fuel pump from the crank shaft of an engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A pump arrangement for the brake system of a motorcar, comprising an engine for driving the motorcar and including a cam shaft; a first pump for pumping fuel consumed by said engine; a brake system for the motorcar including a second pump for pumping brake fluid to said brake system; follower means including a push-rod mounted for reciprocation and having two ends; connecting means comprising a two-armed lever having first and second ends cooperating with said first and second pumps respectively, one end of said push-rod engaging said second end of said lever, the other end of said push-rod cooperating with said cam shaft so that said pumps are operated by said cam shaft via said two-armed lever.

2. Pump arrangement as claimed in claim 1, further comprising a pump housing for said first and second pumps; and wherein said engine includes an engine housing supporting said cam shaft and said pump housing.

3. A pump arrangement as defined in claim 1, wherein said first and second pumps have respective pistons, one of said pistons being coaxial with said push-rod.

4. A pump arrangement as defined in claim 3, wherein said one of said pistons is said second piston.

5. A pump arrangement as defined in claim 1, further comprising supporting means including a guideway, said push-rod being mounted in said guideway and said ends of said push-rod being located outside of said guideway.

6. Pump arrangement as claimed in claim 5, wherein said supporting means include a pump housing mounted on said engine and having said guideway; and wherein said first and second pumps include first and second cylinder means mounted on said housing, and having first and second inlet and outlet means for fuel and brake fluid, respectively.

7. Pump arrangement as claimed in claim 6, wherein said connecting means includes a pivot means in said housing, and a connecting lever mounted on said pivot means for angular movement and having first and second ends cooperating with said first and second pumps, and being angularly reciprocated by said push-rod.

8. Pump arrangement as claimed in claim 1, wherein said brake system includes a master cylinder, a wheel brake cylinder, and a return conduit connecting said brake cylinder with said master cylinder; and wherein said second pump is located in said return conduit for pumping brake fluid from said brake cylinder back to said master cylinder.

9. Pump arrangement as claimed in claim 8, wherein said brake system includes a brake conduit for connecting said master cylinder with said brake cylinder, and control valve means in said brake conduit and return conduit having a first position connecting said master cylinder with said brake cylinder, and interrupting said return conduit, and a second position disconnecting said master cylinder from said brake cylinder, and connecting said return conduit with said second pump so that said second pump pumps brake fluid from said brake cylinder into said master cylinder.

10. Pump arrangement as claimed in claim 9, wherein said brake system includes sensing means for sensing a brake-locked wheel of said motor car, and operatively connected with said control valve means for shifting the same between said first position and said second position.

11. Pump arrangement as defined in claim 5, wherein said first and second pumps have first and second pistons and first and second parallel piston rods; wherein said two-armed lever has a central portion pivotally mounted on said supporting means, said first and second ends are connected with said first and second piston rods, respectively, said one end of said push-rod engaging said second end of said two-armed lever so that said first and second pistons move in opposite directions and produce suction and pressure, respectively, during simultaneous strokes.

* * * * *